(12) United States Patent
Czarnecki et al.

(10) Patent No.: US 7,910,075 B2
(45) Date of Patent: Mar. 22, 2011

(54) SYSTEM AND METHOD OF PROTECTING A $NO_x$ REDUCING CATALYST

(75) Inventors: Lawrence J. Czarnecki, Knoxville, TN (US); Mikael Larsson, Mölndal (SE)

(73) Assignee: ALSTOM Technologies Ltd. (CH)

( * ) Notice: Subject to any disclaimer, the term of this patent is extended or adjusted under 35 U.S.C. 154(b) by 0 days.

(21) Appl. No.: 12/507,368

(22) Filed: Jul. 22, 2009

(65) Prior Publication Data
US 2010/0021363 A1 Jan. 28, 2010

Related U.S. Application Data

(60) Provisional application No. 61/083,576, filed on Jul. 25, 2008.

(51) Int. Cl.
*B01D 53/50* (2006.01)
*B01D 53/56* (2006.01)
*B01D 53/74* (2006.01)
*B01D 53/75* (2006.01)
*B01D 51/10* (2006.01)
*B01J 33/00* (2006.01)

(52) U.S. Cl. .......... 423/210; 423/239.1; 423/244.07; 423/244.08; 423/215.5; 422/111; 422/168; 422/169; 422/177; 422/180; 431/2; 431/3; 431/4

(58) Field of Classification Search .......... 423/210, 423/239.1, 244.07, 244.08, 215.5; 422/111, 422/168, 169, 177, 180; 431/2, 3, 4
See application file for complete search history.

(56) References Cited

U.S. PATENT DOCUMENTS

| 3,718,733 | A | * | 2/1973 | Gehri ........................ 423/213.2 |
|---|---|---|---|---|
| 4,070,305 | A | * | 1/1978 | Obayashi et al. ............... 502/54 |
| 6,303,083 | B1 | | 10/2001 | Johnson et al. |
| 7,118,721 | B2 | | 10/2006 | Rini et al. |
| 7,427,384 | B2 | | 9/2008 | Kinnunen |
| 2002/0182122 | A1 | | 12/2002 | Wietzke et al. |
| 2003/0007918 | A1 | | 1/2003 | Fan et al. |

FOREIGN PATENT DOCUMENTS

| EP | 1 764 145 | 3/2007 |
|---|---|---|
| WO | WO 97/25138 | 7/1997 |
| WO | WO 2006/031237 | 3/2006 |
| WO | WO 2006/036819 | 4/2006 |

OTHER PUBLICATIONS

Kavidass, S.; et al. "Why Build a Circulating Fluidized Bed Boiler to Generate Steam and Electric Power" Power-Gen Asia 2000; Bangkok, Thailand; Sep. 20-22, 2000.
Clean Coal Today; The Office of Clean Coal Technology, U.S. Department of Energy; Issue No. 7, Summer 1992 (whole issue).
"The JEA Large-Scale CFB Combustion Demonstration Project" Clean Coal Technology; Topical Report No. 22, Mar. 2003.
PCT International Search Report and the Written Opinion of the International Searching Authority dated Dec. 29, 2009—(PCT/US2009/051491).

* cited by examiner

*Primary Examiner* — Timothy C Vanoy
(74) *Attorney, Agent, or Firm* — Michaud-Kinney Group LLP

(57) ABSTRACT

A method of protecting a NOx reducing catalyst 140 from fouling, where the NOx reducing catalyst 140 is downstream of a circulating fluidized bed (CFB) boiler 120 and upstream of a particulate removal device 150. The method includes introducing a $SO_x$ removing reagent 212 in a calcium to sulfur molar ratio greater than that required for $SO_2$ removal from a flue gas 122 generated by a CFB 120, thereby preventing $SO_3$ formation and fouling of the NOx reducing catalyst 140.

20 Claims, 3 Drawing Sheets

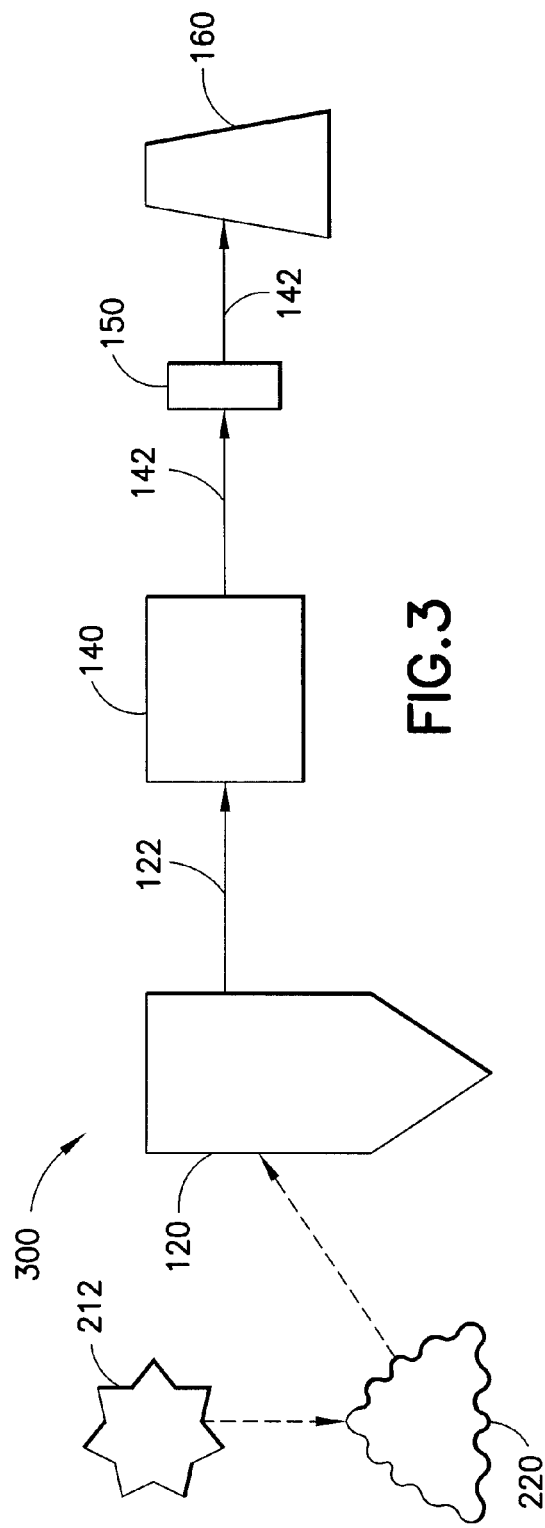
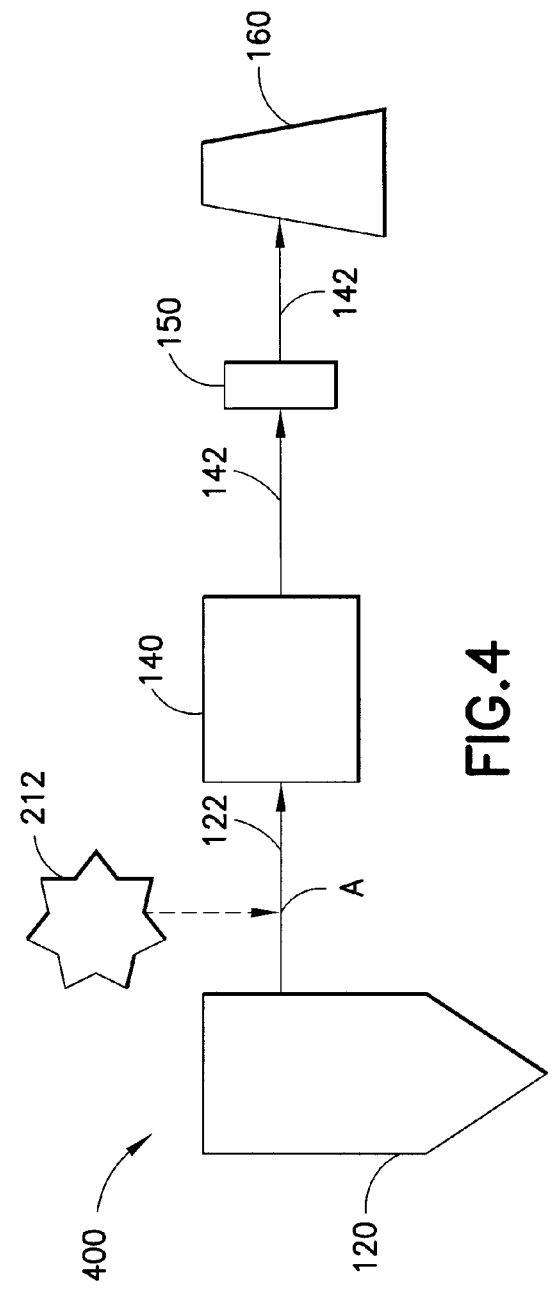

SYSTEM AND METHOD OF PROTECTING A NO$_x$ REDUCING CATALYST

CROSS-REFERENCE TO RELATED APPLICATION

This application claims the benefit of U.S. provisional application No. 61/083,576 filed Jul. 25, 2008, the contents of which are incorporated herein by reference in their entirety.

BACKGROUND

1. Field of the Invention

The disclosed subject matter relates to a flue gas processing system employing a catalyst to remove or reduce the amount of nitrogen oxides (NO$_x$) released from the flue gas processing system. More particularly, the disclosed subject matter relates to a method of protecting the catalyst from fouling.

2. Description of Related Art

Burning of carbonaceous fuels results in generation of many byproducts, including, but not limited to carbon monoxide (CO), hydrocarbons, soot, nitrogen oxides (NO$_x$), sulfur oxides (SO$_x$) and the like. In the United States, release of such byproducts into the environment is tightly regulated by various federal and state laws and regulations. Accordingly, technology that reduces or eliminates the emission of CO, hydrocarbons, soot, NO$_x$, SO$_x$ and the like, have been developed and introduced to process the exhaust gases (referred to as "flue gas") containing these byproducts.

Flue gas treatment techniques that reduce or eliminate NO$_x$ emissions typically employ various chemical or catalytic methods. Methods include non-selective catalytic reduction (NSCR), selective catalytic reduction (SCR) and selective non-catalytic reduction (SNCR) (hereinafter collectively referred to as "NO$_x$ reducing catalysts"). Alternatively, NO may be oxidized to NO$_2$ for removal by wet scrubbers.

The NSCR method typically uses unburned hydrocarbons and CO to reduce NO$_x$ emissions in the absence of O$_2$. Chemical reactions on a solid catalyst surface of SCR systems convert NO$_x$ to N$_2$. Commercial SCR systems typically use ammonia (NH$_3$) as the reductant. SCR technology generally involves injecting ammonia into the flue gas and passing it over a catalyst where the ammonia reacts with NOx to produce molecular nitrogen and water vapor.

NO$_x$ reducing catalysts are often completely or partially deactivated when exposed to flue gas (oftentimes referred to as "fouling"). Partial or complete deactivation of the catalysts occur when calcium deposits, commonly calcium oxide, become sulfated and form calcium sulfate, thereby plugging the pores of the catalyst and interfering with the reduction of NO$_x$. Accordingly, only certain fuels and boilers or furnaces are used in conjunction with a NO$_x$ reducing catalyst.

Partial or complete deactivation of NO$_x$ reducing catalysts may result in increased NOx emissions, partial or complete plant shut down, or replacement of the catalyst. Such drawbacks increase interruptions to plant productivity which may lead to a decrease in the efficiency of the plant as well as an increase in costs of running the plant.

Placement of a particulate removal device prior to the NOx reducing catalyst may slow down the deactivation of the NOx reducing catalyst. However, particulate removal devices increase construction and operating expenses of the flue gas processing system. Moreover, retrofitting a particulate removal device and/or a NOx reducing catalyst in a system to decrease NOx emissions is a costly endeavor due to system and operation re-design.

SUMMARY

According to aspects illustrated herein, there is provided a method of protecting a NOx reducing catalyst from fouling, where the NOx reducing catalyst is downstream of a circulating fluidized bed (CFB) boiler and upstream of a particulate removal device, the method including: introducing a SO$_x$ removing reagent in a calcium to sulfur molar ratio greater than that required for SO$_2$ removal from a flue gas generated by a CFB boiler, thereby preventing SO$_3$ formation and fouling of the NOx reducing catalyst.

According to another aspect illustrated herein, there is provided a method of maintaining an amount of SO$_x$ removing reagent introduced to a flue gas processing system having a circulating fluidized bed (CFB) boiler adapted to combust one or more types of fuel, the method including: combusting a first fuel in a CFB boiler, thereby producing a first flue gas; introducing a SO$_x$ removing reagent to the flue gas processing system to remove an amount of SO$_x$ from the flue gas produced by combustion of the first fuel, the SO$_x$ removing reagent introduced in a calcium to sulfur molar ratio greater than that required for SO$_2$ removal from the flue gas; removing the first fuel from the CFB boiler; and combusting a second fuel in the CFB boiler, thereby producing a second flue gas, wherein an amount of SO$_x$ present in the second flue gas is removed by the SO$_x$ removing reagent, the amount of SO$_x$ removing reagent introduced to the CFB boiler combusting the second fuel is maintained at the same amount introduced to the CFB boiler combusting the first fuel.

According to another aspect illustrated herein, there is provided a system for protecting a NO$_x$ reducing catalyst from fouling, where the NO$_x$ reducing catalyst is downstream of a circulating fluidized bed (CFB) boiler and upstream of a particulate removal device, the system including: a SO$_x$ removing reagent in a calcium to sulfur molar ratio greater than that required for SO$_2$ removal from a flue gas generated by a CFB boiler, thereby preventing SO$_3$ formation and fouling of the NOx reducing catalyst.

The above described and other features are exemplified by the following figures and detailed description.

BRIEF DESCRIPTION OF THE DRAWINGS

Referring now to the figures, which are exemplary embodiments, and wherein the like elements are numbered alike:

FIG. 3 is a diagram depicting an example of another embodiment of a system employing a CFB boiler upstream a NO$_x$ reducing catalyst;

FIG. 4 is a diagram depicting an example of another embodiment of a system employing a CFB boiler upstream a NO$_x$ reducing catalyst.

DETAILED DESCRIPTION

Figure 1:
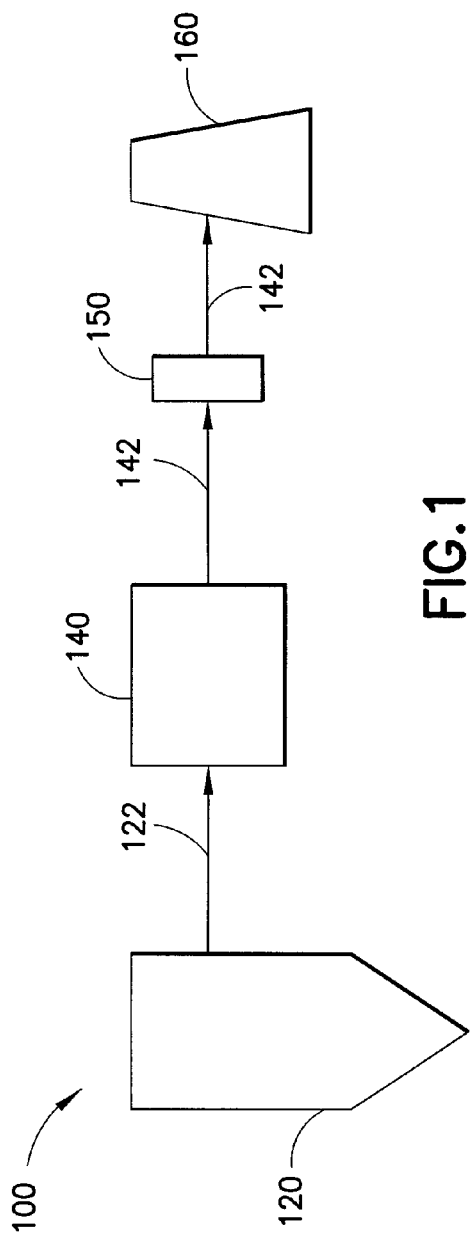
FIG. 1 is a diagram depicting an example of one embodiment of a system employing a CFB boiler upstream a NO$_x$ reducing catalyst.

FIG. 1 illustrates a flue gas processing system 100 employing a circulating fluidized bed boiler 120 (hereinafter referred to as "CFB boiler"). A NO$_x$ reducing catalyst 140 is positioned downstream of the CFB boiler 120. A particulate removal device 150 is positioned downstream of the $NO_x$ reducing catalyst 140. $NO_x$ reducing catalyst 140 may be any type of catalyst capable of reducing $NO_x$ to molecular nitrogen. Examples of $NO_x$ reducing catalysts include SCR catalysts, SNCR catalysts, and NSCR catalysts. In one embodiment, system 100 employs an SCR catalyst as the $NO_x$ reducing catalyst 140.

Upon combustion of a fuel (not shown in FIG. 1), CFB boiler 120 produces flue gas 122. Flue gas 122 may contain a variety of particles and other contaminants, such as, for example, $SO_x$, $NO_x$, CO, mercury, and the like. Downstream processing removes or reduces the concentration of the particulates and contaminants found in flue gas 122.

Still referring to FIG. 1, the concentration of $NO_x$ present in flue gas 122 is reduced by transporting and introducing the flue gas 122 to $NO_x$ reducing catalyst 140. In turn, $NO_x$ reducing catalyst 140 generates a reduced $NO_x$ concentration flue gas 142, which is transported to particulate removal device 150 and eventually stack 160, for release to the environment. Particulate removal device device 150 may be any device known for removing particulates from a flue gas, including, but not limited to, either a bag house or an electrostatic precipitator or a mechanical collector device. It is contemplated that reduced $NO_x$ concentration flue gas 142 may be transported to other post-combustion processors prior to reaching stack 160.

The presence of various contaminants, such as $SO_3$, in flue gas 122 may partially or completely deactivate $NO_x$ reducing catalyst 140. In one embodiment, as illustrated in FIGS. 2-5, a $SO_x$ removing reagent 212 is introduced to the system upstream of the $NO_x$ reducing catalyst 140 to protect the $NO_x$ reducing catalyst 140 from partial or complete deactivation, e.g., fouling. The $SO_x$ removing reagent 212 interacts with $SO_x$ present in the flue gas 122 or CFB boiler 120, thereby reducing the concentration of the $SO_x$, and particularly sulfur trioxide ($SO_3$), prior to the flue gas 122 being introduced to the $NO_x$ reducing catalyst 140.

The $SO_x$ removing reagent 212 introduced to the system may be any substance that reduces the amount of sulfur trioxide ($SO_3$) emitted from the CFB boiler 120 in the flue gas 122. $SO_x$ removing reagents 212 include, but are not limited to, magnesium oxide and calcium-based $SO_x$ removing reagents. Calcium-based $SO_x$ removing reagents 212 include, but are not limited to, lime, limestone, calcium carbonate, calcium oxide, and the like. The SOx removing reagent 212 may be in any form, i.e., a solid, a liquid, in solution, and the like.

Figure 2:
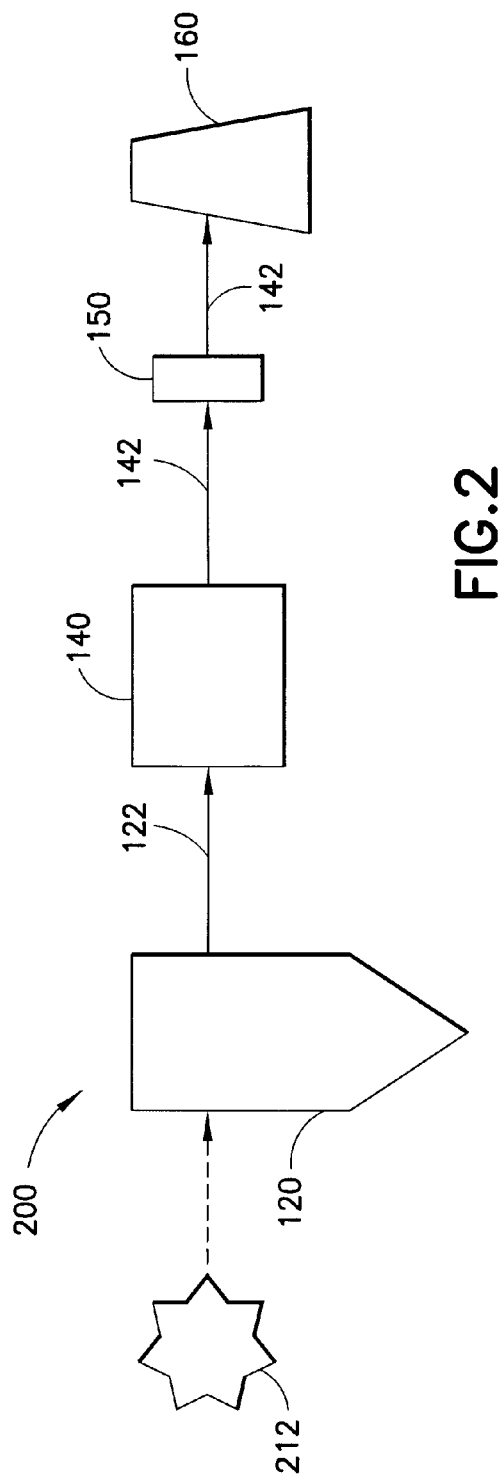
FIG. 2 is a diagram depicting an example of another embodiment of a system employing a CFB boiler upstream a NO$_x$ reducing catalyst.

In one embodiment, as shown in FIG. 2, in a system 200 the $SO_x$ removing reagent 212 is introduced to CFB boiler 120. The $SO_x$ removing reagent 212 may be introduced to the CFB boiler 120 by injection, spray, feed, or any other method that is capable of introducing the $SO_x$ removing reagent 212 to the CFB boiler 120.

In another embodiment, as shown in FIG. 3, in a flue gas processing system 300 the $SO_x$ removing reagent 212 is introduced to a fuel 220 prior to the fuel 220 being introduced to CFB boiler 120. The $SO_x$ removing reagent 212 is introduced to the fuel 220 by impregnation, spraying, feeding, injecting, or any other method that is capable of introducing the $SO_x$ removing reagent 212 to the fuel 220. The fuel 220 may be any type of fuel capable of being used in the CFB boiler 120, such as, for example, coal, wood, biomass (e.g. agricultural waste), pet coke, municipal and industrial waste, tires, and the like. It is also contemplated that the $SO_x$ removing reagent 212 can be added to both the fuel 220, as well as directly to the CFB boiler 120 (as shown in FIG. 2).

In a flue gas process system 400, illustrated in FIG. 4, the $SO_x$ removing reagent 212 is introduced to the system 400 at a point A, which is downstream of CFB boiler 120 and upstream of $NO_x$ reducing catalyst 140. The $SO_x$ removing reagent 212 is introduced at point A by spray, feed, injection, or any other method that is capable of introducing the $SO_x$ removing reagent 212 to point A of the system 400. While not shown in FIG. 4, it is contemplated that the $SO_x$ removing reagent 212 may be introduced at point A as well as to the fuel 220 (FIG. 3) and/or the CFB boiler 120 (FIG. 2).

Referring collectively to FIGS. 1-5, the $SO_x$ removing reagent 212 is introduced to the flue gas processing system in a calcium to sulfur molar ratio (Ca/S molar ratio) that is greater than a molar ratio required to remove $SO_2$ from flue gas 122. That is, the amount of $SO_x$ removing reagent 212 introduced to the system is an amount that removes substantially all $SO_2$ and prevents formation of $SO_3$ in the flue gas 122 produced by CFB boiler 120 and introduced to the $NO_x$ reducing catalyst 140. Typically, the amount of $SO_x$ removing reagent 212 introduced to the system to remove $SO_2$ from the flue gas is at a calcium to sulfur (Ca/S) stoichiometric ratio of about 1. Accordingly, the amount of $SO_x$ removing reagent 212 introduced to the system to prevent formation of $SO_3$ in the flue gas 122 at a Ca/S ratio level greater than 1.

In one example, the $SO_x$ removing reagent 212 is introduced at a Ca/S molar ratio between about 2.2 and 2.8. Specific ratios include, but are not limited to 2.25, 2.37, 2.43, 2.64, 2.72 and 2.73. In another example, the $SO_x$ removing reagent 212 is introduced at a Ca/S molar ratio of about 2.2. In another example, the $SO_x$ removing reagent 212 is introduced at a Ca/S molar ratio of about 2.3. In another example, the $SO_x$ removing reagent 212 is introduced at a Ca/S molar ratio of about 2.4. In another example, the $SO_x$ removing reagent 212 is introduced at a Ca/S molar ratio of about 2.5. In another example, the $SO_x$ removing reagent 212 is introduced at a Ca/S molar ratio of about 2.6. In another example, the $SO_x$ removing reagent 212 is introduced at a Ca/S molar ratio of about 2.7.

In another example, the $SO_x$ removing reagent 212 is introduced to the system where the molar ratio of the $SO_x$ removing reagent 212 is introduced at a level between 2 to 3 times the molar ratio needed to remove at least 90% of the $SO_2$ from the flue gas.

In yet another example, the $SO_x$ removing reagent 212 is introduced in an amount where the molar ratio amount of calcium introduced to the flue gas processing system is at a level of about 2 times the molar ratio needed to remove at least 90% of the $SO_2$ from the flue gas. In yet another example, the $SO_x$ removing reagent 212 is introduced in an amount where the molar ratio amount of calcium introduced to the flue gas processing system is at a level of about 2 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.2 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.2 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.3 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.3 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.4 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.4 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.5 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.5 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.6 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.6 times the molar ratio needed to remove at least 95% of the $SO_2$ from the flue gas. In yet another example, the $SO_x$ removing reagent 212 is introduced in an amount where the molar ratio amount of calcium introduced to the flue gas processing system is at a level of about 2.7 times the molar ratio needed to remove at least 90% of the $SO_2$ from the flue gas. In still a further example, the $SO_x$ removing reagent 212 is introduced in an amount where the molar ratio amount of calcium introduced to the flue gas processing system is at a level of about 2.7 times the molar ratio needed to remove at least 95% of the $SO_2$ from the flue gas.

The amount of the $SO_x$ removing reagent 212 introduced to the flue gas processing system is effective in protecting the $NO_x$ reducing catalyst 140 from partial or complete deactivation since it reacts with the $SO_x$ present in the flue gas 122, thereby reducing the amount of $SO_3$ present in the $NO_x$ removing catalyst 140. As will be appreciated, the actual amount of $SO_x$ removing reagent 212 effective to protect the $NO_x$ reducing catalyst 140 from partial or complete deactivation will vary from system to system.

Figure 5:
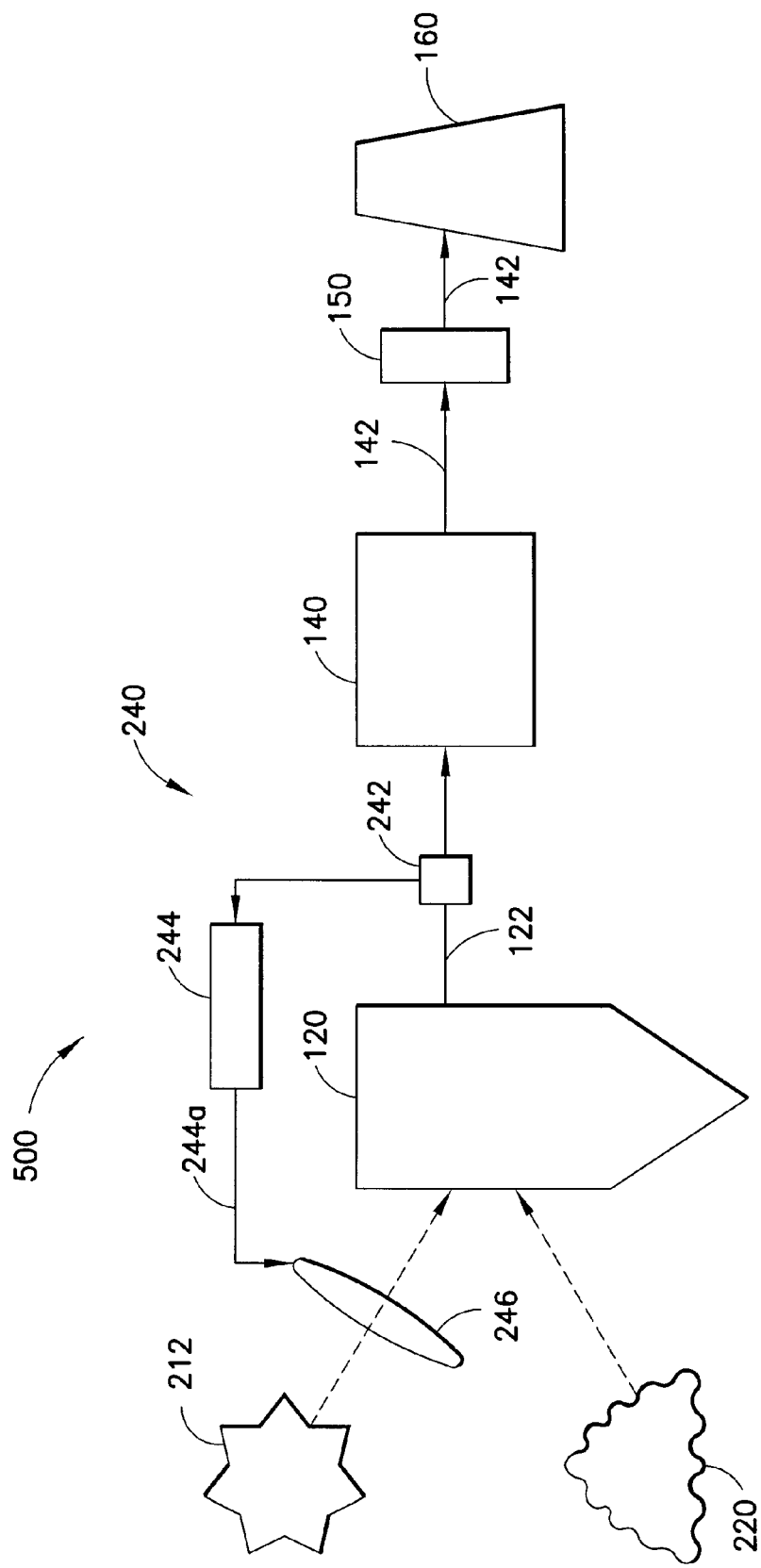
FIG. 5 is a diagram depicting an example of another embodiment of a system employing a CFB boiler upstream a NO$_x$ reducing catalyst

As shown in FIG. 5, in one embodiment, the amount of the $SO_x$ removing reagent 212 introduced to flue gas processing system 500 can be maintained or adjusted (increased or decreased) to a desired level. The level of the $SO_x$ removing reagent 212 will vary from system to system and may depend on one or more variables, including, but not limited to, the concentration of $SO_x$ in the flue gas emitted to the environment, the fuel combusted in the CFB boiler 120, the reducing catalyst 140, as well as the overall design of the system 500.

Control of an amount of the $SO_x$ removing reagent 212 introduced to the system 500 may be accomplished by providing a control system 240. The control system 240 includes a $SO_x$ sensor 242 responsive to the amount or level of $SO_x$ present in the flue gas 122. In one embodiment, the $SO_x$ sensor 242 senses an amount or level of $SO_3$ present in flue gas 122. The $SO_x$ sensor 242 is in communication with a controller 244. The controller 244 is configured to generate and output a control signal 244a in response to the input from $SO_x$ sensor 242. The controller 244 is in communication with a flow/valve control device 246, which, as shown in FIG. 5, can restrict, increase or maintain the amount of $SO_x$ removing reagent 212 introduced to the CFB boiler 120. The position of flow/valve control device 246 is dependent on where $SO_x$ removing reagent 212 is introduced to system 500.

In one example, if an amount of $SO_x$, such as $SO_3$, exceeds a predetermined level set by a user, control system 240 increases the amount of the $SO_x$ reducing reagent 212 introduced to the system 500. In another example, if an amount of $SO_x$, such as $SO_3$, is below a predetermined level set by a user, control system 240 may either maintain or decrease an amount of the $SO_x$ reducing reagent 212 introduced to the system 500.

It is contemplated that the flue gas processing systems illustrated in FIGS. 1-5 may allow a user to maintain an amount of the $SO_x$ removing reagent 212 if the fuel 220 combusted in the CFB boiler 120 is changed. As can be appreciated in the art, a user may want to switch from combusting one fuel, such as Powder River Basin (PRB) coal, to another fuel, such as bituminous coal. The concentration of $SO_x$ and calcium vary from fuel to fuel. However, if the level of the $SO_x$ removing reagent 212 is maintained at a level where the calcium to sulfur molar ratio is greater than a molar ratio required to remove $SO_2$ from flue gas 122 exiting CFB boiler 120, a user would not have to adjust (either increase or decrease) the amount of the $SO_x$ removing reagent 212 introduced to the system, since the amount of the $SO_x$ removing reagent 212 already exceeds what is needed to reduce the level of $SO_2$ and $SO_3$ in the system.

In one embodiment of maintaining an amount of $SO_x$ removing reagent 212 introduced to a CFB boiler 120, the CFB boiler 120 is adapted to combust one or more types of fuel. A first fuel, such as, but not limited to PRB, is combusted in the CFB boiler 120 to produce a first flue gas. The $SO_x$ removing reagent 212, such as limestone, is introduced to the system to remove an amount of $SO_x$ from the flue gas produced by combustion of the first fuel. As shown in FIGS. 1-5, the first flue gas proceeds to the $NO_x$ reducing catalyst 140.

As discussed above, the $SO_x$ removing reagent 212 may be introduced in one or more locations throughout the system, including, but not limited to, directly into the CFB boiler 120, a position between the CFB boiler 120 and the NOx reducing catalyst 140, the fuel 220, or a combination thereof. The $SO_x$ removing reagent 212 is introduced in a calcium to sulfur molar ratio greater than that required for $SO_2$ removal from the flue gas.

The first fuel is removed from the CFB boiler 120 and a second fuel, such as, but not limited to, bituminous coal, is added to the CFB boiler 120 and combusted. Combustion of the second fuel creates a second flue gas that includes, inter alia, SOx. The $SO_x$ present in the second flue gas is removed by the $SO_x$ removing reagent 212, the amount of which is maintained at the same amount (or level or ratio) that was used when the first fuel was combusted.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of protecting a NOx reducing catalyst from fouling, where the NOx reducing catalyst is downstream of a circulating fluidized bed (CFB) boiler and upstream of a particulate removal device, the method comprising:
   introducing a $SO_x$ removing reagent in a calcium to sulfur molar ratio greater than that required for $SO_2$ removal from a flue gas generated by a CFB boiler, thereby preventing $SO_3$ formation and fouling of the NOx reducing catalyst.

2. A method according to claim 1, further comprising adjusting an amount of the $SO_x$ removing reagent in response to an amount of $SO_x$ detected in the flue gas downstream of the CFB boiler, wherein the amount of $SO_x$ in the flue gas is detected by an $SO_x$ sensor.

3. A method according to claim 1, wherein the calcium to sulfur molar ratio is between about 2.0 to about 2.8.

4. A method according to claim 1, wherein the molar ratio of the $SO_x$ removing reagent is between about 2 to about 3 times the molar ratio needed to remove at least 90% of the $SO_2$ from the flue gas.

5. A method according to claim 1, wherein the $SO_x$ removing reagent is introduced directly to the CFB boiler.

6. A method according to claim 1, wherein the $SO_x$ removing reagent is introduced to fuel combusted in the CFB boiler.

7. A method according to claim 1, wherein the $SO_x$ removing reagent is introduced to the flue gas at a position downstream of the CFB boiler.

8. A method according to claim 1, wherein the $SO_x$ removing reagent is introduced to the CFB boiler and the flue gas at a position upstream of the $NO_x$ reducing catalyst.

9. A method according to claim 1, wherein the $SO_x$ removing reagent is limestone.

10. A method of maintaining an amount of $SO_x$ removing reagent introduced to a flue gas processing system having a circulating fluidized bed (CFB) boiler adapted to combust one or more types of fuel, the method comprising:
    combusting a first fuel in a CFB boiler, thereby producing a first flue gas;
    introducing a $SO_x$ removing reagent to the flue gas processing system to remove an amount of $SO_x$ from the flue gas produced by combustion of the first fuel, the $SO_x$ removing reagent introduced in a calcium to sulfur molar ratio greater than that required for $SO_2$ removal from the flue gas;
    removing the first fuel from the CFB boiler; and
    combusting a second fuel in the CFB boiler, thereby producing a second flue gas, wherein an amount of $SO_x$ present in the second flue gas is removed by the $SO_x$ removing reagent, the amount of $SO_x$ removing reagent introduced to the CFB boiler combusting the second fuel is maintained at the same amount introduced to the CFB boiler combusting the first fuel.

11. A method according to claim 10, wherein the $SO_x$ removing reagent is limestone.

12. A method according to claim 11, further comprising independently introducing the first and second flue gas to a NOx removing catalyst downstream of the CFB boiler.

13. A system for protecting a $NO_x$ reducing catalyst from fouling, where the $NO_x$ reducing catalyst is downstream of a circulating fluidized bed (CFB) boiler and upstream of a particulate removal device, the system comprising:
    an injector, sprayer, or feeder to introduce into said system a $SO_x$ removing reagent in a calcium to sulfur molar ratio greater than that required for $SO_2$ removal from a flue gas generated by a CFB boiler, thereby preventing $SO_3$ formation and fouling of the $NO_x$ reducing catalyst.

14. A system according to claim 13, further comprising a control system for detecting an amount of $SO_3$ in the flue gas downstream of the CFB boiler and adjusting an amount of $SO_x$ removing reagent introduced to the system.

15. A system according to claim 13, wherein the calcium to sulfur molar ratio is between about 2.0 and about 2.8.

16. A system according to claim 13, wherein the molar ratio of the $SO_x$ removing reagent is between about 2 to about 3 times the molar ratio needed to remove at least 90% of the $SO_2$ from the flue gas.

17. A system according to claim 13, wherein the $SO_x$ removing reagent is introduced directly to the CFB boiler.

18. A system according to claim 13, wherein the $SO_x$ removing reagent is introduced to fuel combusted in the CFB boiler.

19. A system according to claim 13, wherein the $SO_x$ removing reagent is introduced to the flue gas at a position downstream of the CFB boiler.

20. A system according to claim 13, wherein the $SO_x$ removing reagent is introduced to the CFB boiler and the flue gas at a position upstream of the $NO_x$ reducing catalyst.

* * * * *